US008150787B2

(12) United States Patent
Maturana (10) Patent No.: US 8,150,787 B2
(45) Date of Patent: Apr. 3, 2012

(54) ENHANCING PERFORMANCE OF A CONSTRAINT SOLVER ACROSS INDIVIDUAL PROCESSES

(75) Inventor: Guillermo R. Maturana, Berkeley, CA (US)

(73) Assignee: Synopsys, Inc., Mountain View, CA (US)

( * ) Notice: Subject to any disclaimer, the term of this patent is extended or adjusted under 35 U.S.C. 154(b) by 875 days.

(21) Appl. No.: 12/176,882

(22) Filed: Jul. 21, 2008

(65) Prior Publication Data

US 2010/0017352 A1  Jan. 21, 2010

(51) Int. Cl.
*G06F 17/00* (2006.01)
(52) U.S. Cl. ......................................................... 706/46
(58) Field of Classification Search ............... 706/55
See application file for complete search history.

(56) References Cited

U.S. PATENT DOCUMENTS 6,834,212 B1 * 12/2004 Patel et al. .................... 700/121
6,865,562 B2 * 3/2005 Fromherz et al. .............. 706/14

OTHER PUBLICATIONS

Ross, Peter "Chapter 17: Hyper-Heuristics", In: E.K. Burke, G. Kendall: "Search Methodologies: Introductory Tutorials in Optimization and decision Support Techniques", 2005, Springer US, XP002610204, pp. 529-556.
Fuchs, Matthias "Towards Full Automation of Deduction: A Case Study", SEKI Report, No. SR-96-07, Oct. 4, 1996, pp. 1-22, XP002610205, http://www-avenhaus.informatik.uni-kl.de/berichte/1996/fuchs.sr-96-07.ps.gz (retrieved on Nov. 17, 2010).
Xu, Lin et al., "SATzilla-07: The Design and Analysis of an Algorithm Portfolio for SAT", LNCS, vol. 4741, pp. 712-727, 2007.

* cited by examiner

*Primary Examiner* — Jeffrey A Gaffin
*Assistant Examiner* — Ababacar Seck
(74) *Attorney, Agent, or Firm* — Park, Vaughan, Fleming & Dowler LLP (57) ABSTRACT

One embodiment of the present invention provides a system that reuses information associated with a constraint solving operation for a problem domain. This system begins by receiving a constraint problem from the problem domain. Then, the system searches through a problem cache for an entry which corresponds to the canonical representation. If a corresponding entry does not exist in the problem cache, the system produces an entry in the problem cache for the canonical representation. Otherwise, if a corresponding entry already exists in the problem cache, the system generates a solution to the canonical representation by reusing the solver heuristic associated with the corresponding entry in the problem cache.

28 Claims, 6 Drawing Sheets

ENHANCING PERFORMANCE OF A CONSTRAINT SOLVER ACROSS INDIVIDUAL PROCESSES

BACKGROUND

1. Field of the Invention

The present invention generally relates to techniques for solving constraint problems for a problem domain. More specifically, the present invention relates to a system for reusing information associated with a constraint solving operation across one or more problem domains.

2. Related Art

Advances in semiconductor fabrication technology have given rise to dramatic increases in the number of transistors per semiconductor device. This increase in transistor count is empowering computer architects to create digital circuit designs with an ever-increasing design complexity. Consequently, as digital circuit designs become more complex, the task of verifying the correctness of the resulting implementations becomes more complicated.

In response, circuit design teams are relying on automation techniques to handle the ever-increasing design complexities. In doing so, these design teams perform constraint solving operations for a number of applications associated with implementing and verifying the functionality of a circuit design. In one application, these design teams perform constraint solving operations to generate constrained random input stimuli to drive a given circuit simulation toward important corner cases. In another application, these design teams perform constraint solving operations during circuit synthesis. However, these applications can be overburdened by a multitude of recurring complex constraint satisfaction problems. Furthermore, a number of independent problem domains (i.e., application instances) must oftentimes solve similar complex constraint satisfaction problems, where one independent problem domain can stand to benefit from the experience of another problem domain.

SUMMARY

One embodiment of the present invention provides a system that reuses information associated with a constraint solving operation for a problem domain. This system begins by receiving a constraint problem from the problem domain. Then, the system searches through a problem cache for an entry which corresponds to the canonical representation. If a corresponding entry does not exist in the problem cache, the system produces an entry in the problem cache for the canonical representation. Otherwise, if a corresponding entry already exists in the problem cache, the system generates a solution to the canonical representation by reusing the solver heuristic associated with the corresponding entry in the problem cache.

In some embodiments, the system produces an entry in the problem cache. In doing so, the system first stores the canonical representation of the constraint problem in the problem cache. Next, the system selects a solver heuristic from a number of available heuristics, and generates a solution to the canonical representation by using the selected solver heuristic. Whenever the selected heuristic fails to generate a solution within a predetermined period of time, the system selects a new solver heuristic and uses the new solver heuristic to generate a solution to the canonical representation. After selecting a solver heuristic, the system associates the selected solver heuristic with the canonical representation entry in the problem cache.

In some embodiments, the system monitors a computation time when generating a solution to a canonical representation, and stores the computation time in the corresponding canonical representation entry in the problem cache.

In some embodiments, the system refines the selection of solver heuristics using a background process.

In some embodiments, the system is capable of executing a number of simultaneous threads, where a respective thread is associated with an independent constraint problem.

In some embodiments, the system converts a constraint problem into a canonical representation.

In some embodiments, when the system converts a constraint problem into a canonical representation, the system partitions the constraint problem into a number of disjoint constraint problems.

In some embodiments, the system provides a persistent solution for a specified canonical representation by recording and preserving in the problem cache the solver heuristic used to first solve the canonical representation, thereby allowing the same heuristic to be used when solving the specified canonical representation at a later time.

In some embodiments, the system provides random stability for a specified canonical representation by recording and preserving in the problem cache the random seed used to first solve the canonical representation, thereby allowing the system to produce a constant solution that is independent of the order in which the individual canonical representations are solved.

In some embodiments, the system records a sequence of constraint problem solutions for a problem domain, and replays the solution sequence for a subsequent problem domain.

In some embodiments, the system reuses the problem cache information across a plurality of independent problem domains associated with one or more applications.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other types of media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other types of programmable-logic devices. When the hardware modules are activated, the hardware modules perform the methods and processes included within the hardware modules.

Overview

Circuit design teams are relying on automation techniques to handle the ever-increasing complexity of circuit designs. In doing so, these design teams perform constraint solving operations for a number of applications associated with implementing and verifying the functionality of a circuit design. In one application, these design teams perform constraint solving operations to generate constrained random input stimuli to drive a given circuit simulation toward important corner cases. In another application, these design teams perform constraint solving operations during circuit synthesis.

However, these applications can be overburdened by a multitude of recurring complex constraint satisfaction problems. Furthermore, a number of independent problem domains (i.e., application instances) must oftentimes solve similar complex constraint satisfaction problems, where one independent problem domain can stand to benefit from the experience of another problem domain. For the remainder of this disclosure, a problem domain refers to an application instance that requires a number of constraint solving operations. For example, a respective circuit simulation from a collection of circuit simulations is a source for a respective problem domain. Embodiments of the present invention provide a system that reuses information associated with a constraint solving operation from a problem domain to improve the performance when revisiting a given constraint problem, and to promote the stability in their solutions.

In some embodiments of the present invention, the system enables constraint solving information to be reused within a given problem domain, while in other embodiments, the system enables this information to be reused across a number of independent or related problem domains over time. Furthermore, in embodiments of the present invention, the system allows for previous solutions to constraint problems to be replayed in sequence to facilitate regression testing. In some embodiments, the system facilitates the persistence of solutions over time for a given constraint solving operation. In further embodiments, the system facilitates random stability when revisiting a given constraint solving operation at a later time.

Constraint Solver System

Figure 1:
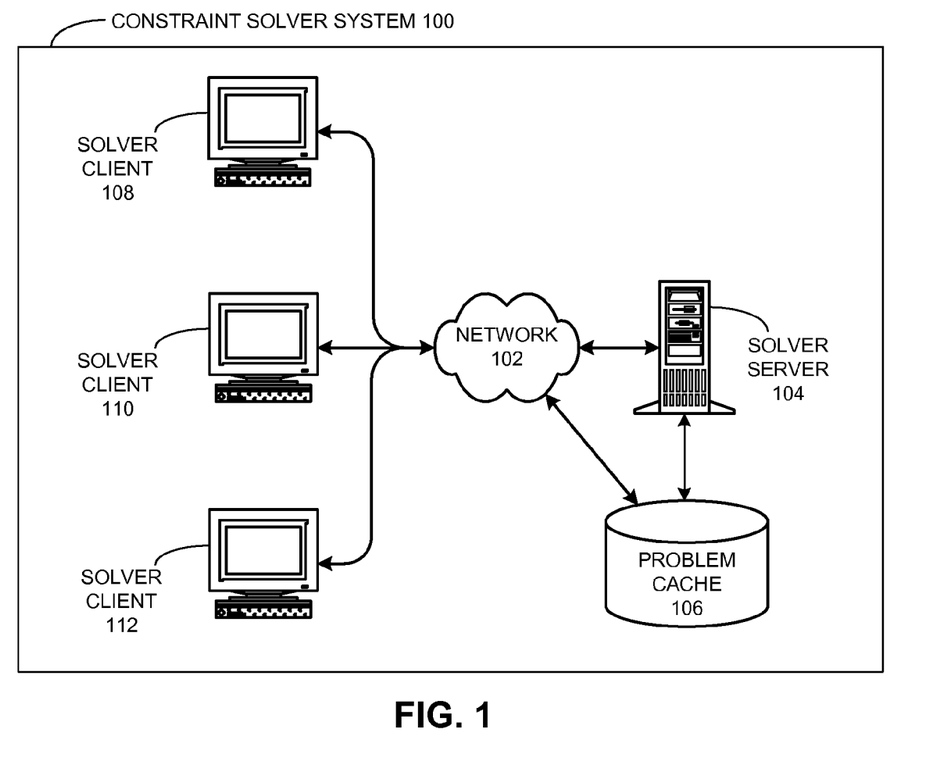
FIG. 1 illustrates a constraint solver system in accordance with an embodiment of the present invention.

FIG. 1 illustrates a constraint solver system 100 in accordance with an embodiment of the present invention. Constraint solver system 100 includes a network 102, a solver server 104, a problem cache 106, and a number of solver clients 108-112. Network 102 can include any type of wired or wireless communication channel. In one embodiment of the present invention, network 102 includes the Internet.

Solver clients 108-112 can include any node with computational capability and a communication mechanism for communicating with solver server 104 through network 102. Solver clients 108-112 perform operations associated with one or more constraint solving applications. In one embodiment of the present invention, solver clients 108-112 perform circuit simulations on one or more circuit designs under verification (DUVs) using either pre-generated input stimuli or using a constrained random stimulus generated by solver server 104. During simulation, a circuit simulator can generate a constraint that defines a complex constraint satisfaction problem, and can send the constraint to solver server 104 to request an input stimulus which satisfies the constraint values.

Solver server 104 can include any node with computational capability and a communication mechanism for communicating with solver clients 108-112 through network 102, and with problem cache 106 either directly or through network 102. Solver server 104 receives a constraint from any of solver clients 108-112, and returns an input stimulus which can satisfy the constraint values. In doing so, solver server 104 generates input stimuli for a constraint by employing one of many available solver heuristics which can solve a given constraint satisfaction problem. Solver server 104 then stores and reuses information pertaining to a constraint solving operation in problem cache 106 to help speed the constraint solving operation of recurring constraints.

Problem cache 106 can include any type of system for storing data in non-volatile storage. This includes, but is not limited to, systems based upon magnetic, optical, or magneto-optical storage devices, as well as storage devices based on flash memory and/or battery-backed up memory. Note that problem cache 106 can be coupled to solver server 104, or to network 102. Problem cache 106 can include information pertaining to a number of constraint solving operations, and/or can store a number of pre-generated input sequences for one or more solver clients 108-112.

Note that different embodiments of the present invention may use different configurations, and are not limited to the configuration illustrated in constraint solver system 100. In some embodiments of the present invention, solver clients 108-112 perform concurrent operations, while in other embodiments, solver clients 108-112 take place at different times. In some variations of these embodiments, solver clients 108-112 exist on the same computing node, while in other variations solver clients 108-112 exist on distributed computing nodes. In some embodiments of the present invention, solver server 104 executes on the same computing node as a given solver client. In other embodiments, solver serer 104 is implemented as a distributed system executing on one or more computing nodes. In yet other embodiments of the present invention, solver server 104 is implemented as a distributed system executing on the same computing nodes that perform solver clients 108-112.

Figure 2:
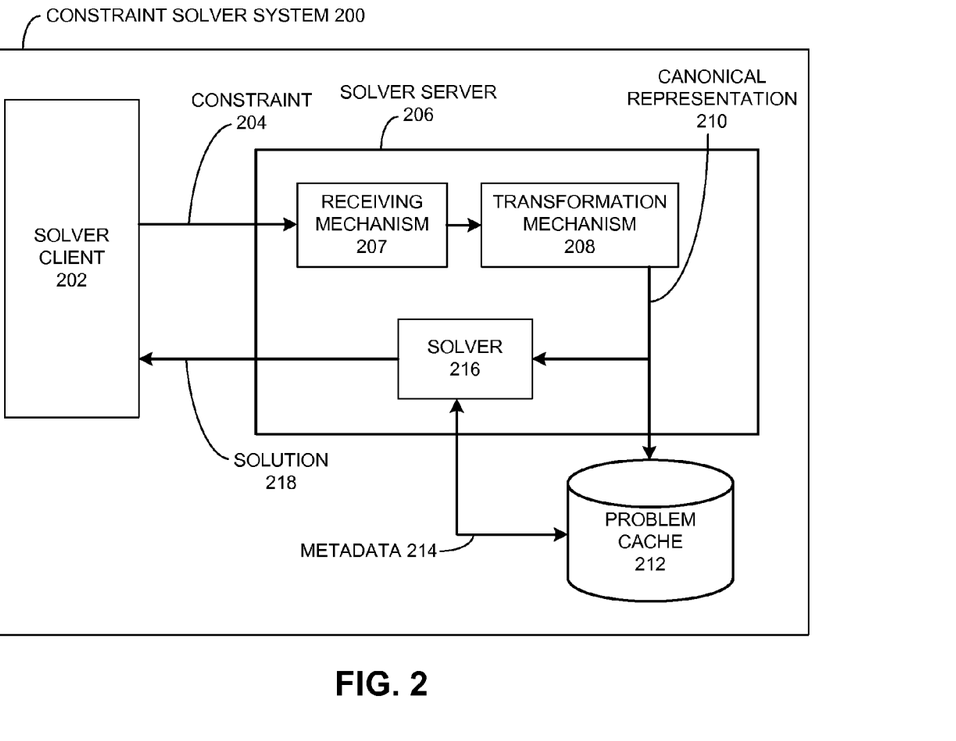
FIG. 2 illustrates the flow of data across a constraint solver system in accordance with an embodiment of the present invention.

FIG. 2 illustrates the flow of data across a constraint solver system 200 in accordance with an embodiment of the present invention. Initially, a solver client 202 sends a constraint 204 to a solver server 206. Solver server 206 uses a receiving mechanism 207 to receive constraint 204 from solver client 202, and uses a transformation mechanism 208 to convert constraint 204 into a canonical representation 210. Next, solver server 206 searches through a problem cache 212 for an entry corresponding to canonical representation 210. A canonical representation of a constraint is a standard representation for the constraint and any other constraints that are similar in structure, such that converting a collection of similar constraints into their canonical representations produces one consistent form. Converting a constraint into its canonical representation allows a solution to a constraint problem in a problem cache to be accessed and reused by any other similar constraints. In some embodiments of the present invention, a canonical representation exists as a binary decision diagram (BDD).

In some embodiments of the present invention, constraint 204 received by receiving mechanism 207 is a canonical representation for a constraint problem from solver client 202.

If a corresponding entry does not exist in problem cache 212, solver server 206 produces an entry by storing canonical representation 210 in problem cache 212. Solver server 206 also forwards canonical representation 210 to a solver 216 to perform a constraint solving operation on canonical representation 210, and generate a solution 218. In doing so, solver 216 selects a solver heuristic from a number of available heuristics, and generates a solution to canonical representation 210 by using the selected solver heuristic. Whenever the selected heuristic fails to generate a solution within a predetermined period of time, solver 216 selects a new solver heuristic and uses the new solver heuristic to generate a solution to canonical representation 210.

After generating a solution to canonical representation 210, solver 216 forwards metadata 214 to problem cache 212, where metadata 214 includes the solver heuristic used and other information associated with the constraint solving operation. Problem cache 212 then associates metadata 214 with the new entry in problem cache 212. As a result, when encountering a constraint problem that is similar to a constraint problem that has been previously explored, solver 216 will solve the constraint problem by using the solver heuristic that was found to be successful.

Otherwise, if a corresponding entry exists in problem cache 212, solver 216 generates a solution 218 to the canonical representation by reusing information associated with the previous constraint solving operation. In doing so, solver 216 first retrieves metadata 214 from the corresponding entry in problem cache 212, including the solver heuristic that was previously used to solve the canonical representation of the constraint problem. Then, solver 216 uses the metadata 214 to generate a solution 218 by recreating the conditions that have previously allowed solver 216 to solve canonical representation 210.

After solver 216 generates solution 218 for canonical representation 210, solver server 206 forwards solution 218 to solver client 202. In a variation of this embodiment, solver server 206 retrieves a pre-computed solution 218 from problem cache 212 and forwards solution 218 to solver client 202.

In embodiments of the present invention, before forwarding solution 218 to solver client 202, solver server 206 converts a solution 218 generated for a canonical representation 210 into a form that is consistent with the original constraint 204. In variations of this embodiment, solver server 206 replaces any generic variable names of a solution 218 generated for a canonical representation 210 with the original variable names of the original constraint 204.

In some embodiments of the present invention, solver server 206 uses a background process to refine the selection of solver heuristics for canonical representation entries in problem cache 212 that are difficult to solve. In one variation of these embodiments, solver server 206 selects a canonical representation entry whose solution has previously required more than a predetermined computation time, and attempts to generate a faster solution using a different solver heuristic.

In some embodiments of the present invention, solver server 206 attempts to optimize the solver heuristic used for a given canonical representation entry by first applying a solver heuristic to solve a subset of the constraint variables from the canonical representation, and subsequently applying the solver heuristic to the remainder of the canonical representation.

Problem Cache

Figure 3:
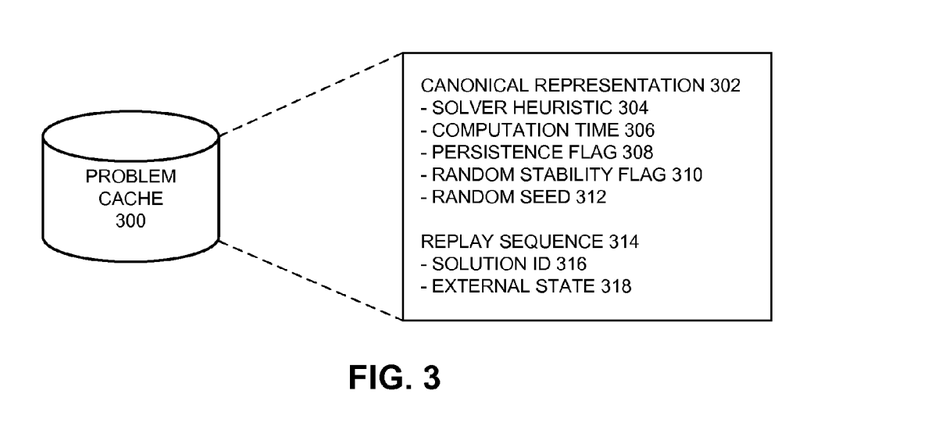
FIG. 3 illustrates a problem cache in accordance with an embodiment of the present invention.

FIG. 3 illustrates a problem cache 300 in accordance with an embodiment of the present invention. Problem cache 300 stores a canonical representation 302 and metadata associated with a constraint solving operation for canonical representation 302. This metadata includes a solver heuristic 304, a computation time 306, a persistence flag 308, a random stability flag 310, and a random seed 312. Solver heuristic 304 is a reference to a solver heuristic that allowed the solver server to generate a solution for canonical representation 302 within a predetermined period of time. Solver server 206 monitors the computation time when generating a solution to canonical representation 210, and stores this time under the computation time 306 entry associated with the canonical representation 302 entry of problem cache 300.

Many uses for solver clients stand to benefit from persistent solutions over time. For example, when a user wishes to reproduce a specific simulation outcome for a DUV, solver server 206 can continue to produce consistent results for the same problems over time. It was previously mentioned that in embodiments of the present invention, the solver server revisits canonical representation entries of the problem cache to refine the selection of solver heuristics that are applied to them. It is important that the solver server does not revisit canonical representation entries whose values are to remain persistent over time. When the persistence flag 308 is set for a canonical representation 302 in problem cache 300, the solver server is not allowed to change the solver heuristic 304 entry for the corresponding canonical representation 302. When the persistence flag 308 is not set, the solver server is allowed to revisit canonical representation 302 in problem cache 300 to search for an optimal solver heuristic that can solve the canonical representation in a shorter computation time.

To further enhance the persistence of solutions over time, some uses for circuit simulations may require random stability when revisiting a canonical representation 302. Random stability refers to the requirement that an operation relying on random numbers must produce consistent results over time for a fixed set of inputs. A random stability violation can occur when the solver server operates on multiple constraints simultaneously for a number of problem domains. In this situation, the constraint solving operation for one problem domain can affect the random seed value used by a subsequent constraint solving operation of another problem domain.

In one embodiment of the present invention, the solver server is capable of handling constraints for a number of solver clients in any order without having one constraint solving operation interfere with the random stability of a subsequent constraint solving operation. The solver server enforces random stability for constraint solving operations on certain canonical representations by allowing a respective canonical representation 302 to set a random stability flag 310 when the solutions to canonical representation 302 must maintain random stability over time. If the random stability flag 310 is set for a given canonical representation entry in problem cache 300, the solver server will store the random seed used to solve the canonical representation 302 into the random seed 312 entry. If the solver server receives a request to solve a constraint whose canonical representation 302 has a corresponding entry in problem cache 300 with the random stability flag 310 being set, then the solver server will retrieve the random seed 312 from the corresponding entry and will use this random seed value as the initial seed of the constraint solving operation.

Replay Mechanism

It is common for circuit designers to require replicating a previous sequence of solutions for a given application of a constraint solver. For example, this can happen as part of a complete regression test on a circuit design, or it can be an isolated simulation run that was previously determined to activate a known design error. Therefore, a user may want to save a previous constrained random input stimuli sequence, and the seed that generated the sequence, to recreate the previous circuit simulation run.

In embodiments of the present invention, problem cache 300 stores a number of replay sequences 314, where a respective replay sequence 314 is accompanied by a solution ID 316 and an external state 318. In these embodiments, the solver server stores the solutions it generates for the constraints it receives from a respective solver client. In doing so, the solver server stores these solutions in sequential order in a replay sequence 314 entry of problem cache 300. Solution ID 316 is an identifier which corresponds to a replay sequence 314 entry, which the solver server uses to match a replay sequence to a given solver client. External state 318 includes information associated with a number of non-random variables that could change in value, and which influence a given constraint problem.

In some embodiments of the present invention, a solver client may request the solver server to provide a replay sequence 314 to reproduce a previous constraint solving application. In other embodiments, a solver client may request a replay sequence 314 that was generated earlier in the same constraint solving application. For example, a circuit simulation may request the solver server to provide a replay sequence 314 during regression simulations for a given DUV, or may even request a replay sequence 314 that was generated earlier in the same circuit simulation.

Transformation Mechanism

Figure 4A:
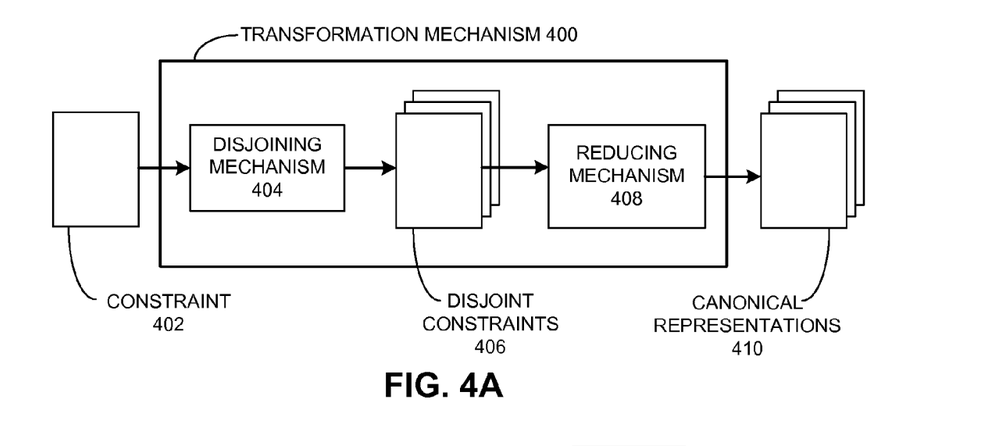
FIG. 4A illustrates a transformation mechanism in accordance with an embodiment of the present invention.

FIG. 4A illustrates a transformation mechanism 400 in accordance with an embodiment of the present invention. Transformation mechanism 400 transforms a constraint 402 into one or more disjoint canonical representations 410. Note that transformation mechanism 400 includes a disjoining mechanism 404 for partitioning constraint 402 into one or more disjoint constraints 406. Furthermore, transformation mechanism 400 also includes reducing mechanism 408, which transforms a disjoint constraint 406 into a canonical representation 410.

Figure 4B:
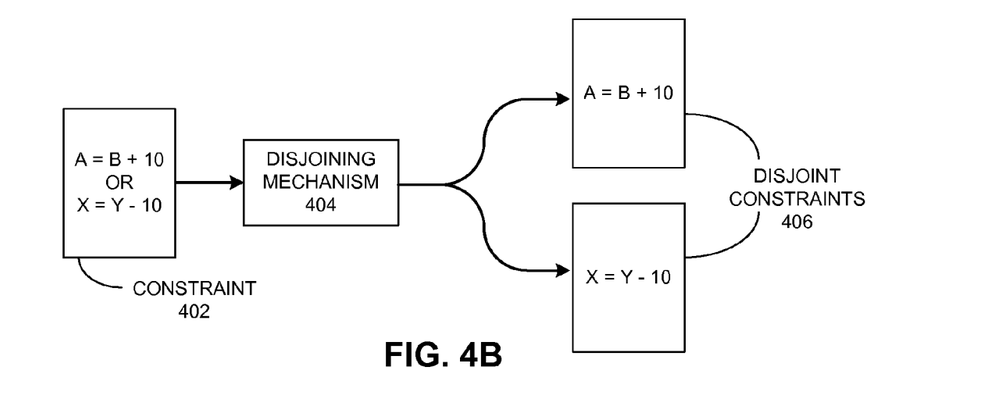
FIG. 4B illustrates a disjoining mechanism in accordance with an embodiment of the present invention.

FIG. 4B illustrates a disjoining mechanism 404 in accordance with an embodiment of the present invention. Disjoining mechanism 404 receives a constraint 402, and produces one or more disjoint constraints 406. A constraint is a disjoint constraint if it is disconnected from and unrelated to other constraints, and it represents a single contiguous problem space. Note that to be able to partition a constraint 402 into multiple disjoint constraints 406, constraint 402 needs to be a description of multiple disjoint problem spaces (e.g., a disjunction of constraints, as depicted in constraint 402 of FIG. 4B).

Figure 4C:
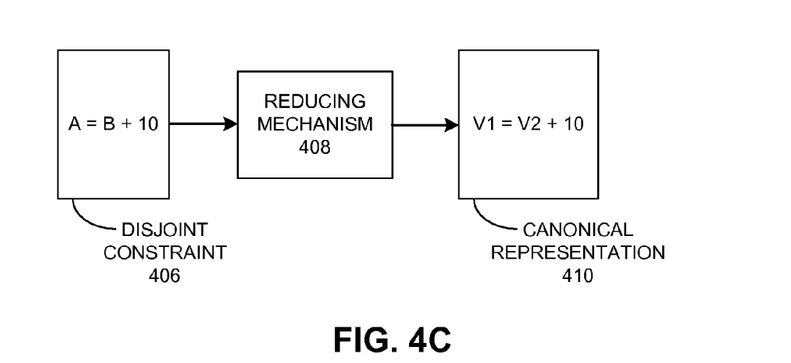
FIG. 4C illustrates a reducing mechanism in accordance with an embodiment of the present invention.

FIG. 4C illustrates a reducing mechanism 408 in accordance with an embodiment of the present invention. During operation, reducing mechanism 408 receives a disjoint constraint 406, and produces a corresponding canonical representation 410. Reducing mechanism 408 produces a corresponding canonical representation by performing a consistent sequence of operations on a disjoint constraint, which transforms constraints that are similar in form into a single canonical representation. To produce a canonical representation 410, reducing mechanism 408 first converts the disjoint constraint 406 into an intermediate representation by converting the order of operations of disjoint constraint 406 into a canonical form. Next, reducing mechanism 408 traverses the intermediate representation in a predetermined order (e.g., from left to right), and produces canonical representation 410 by replacing the sequence of variable names of the intermediate representation with an incrementing sequence of variable names (e.g., V1, V2 . . . Vn).

Figure 5:
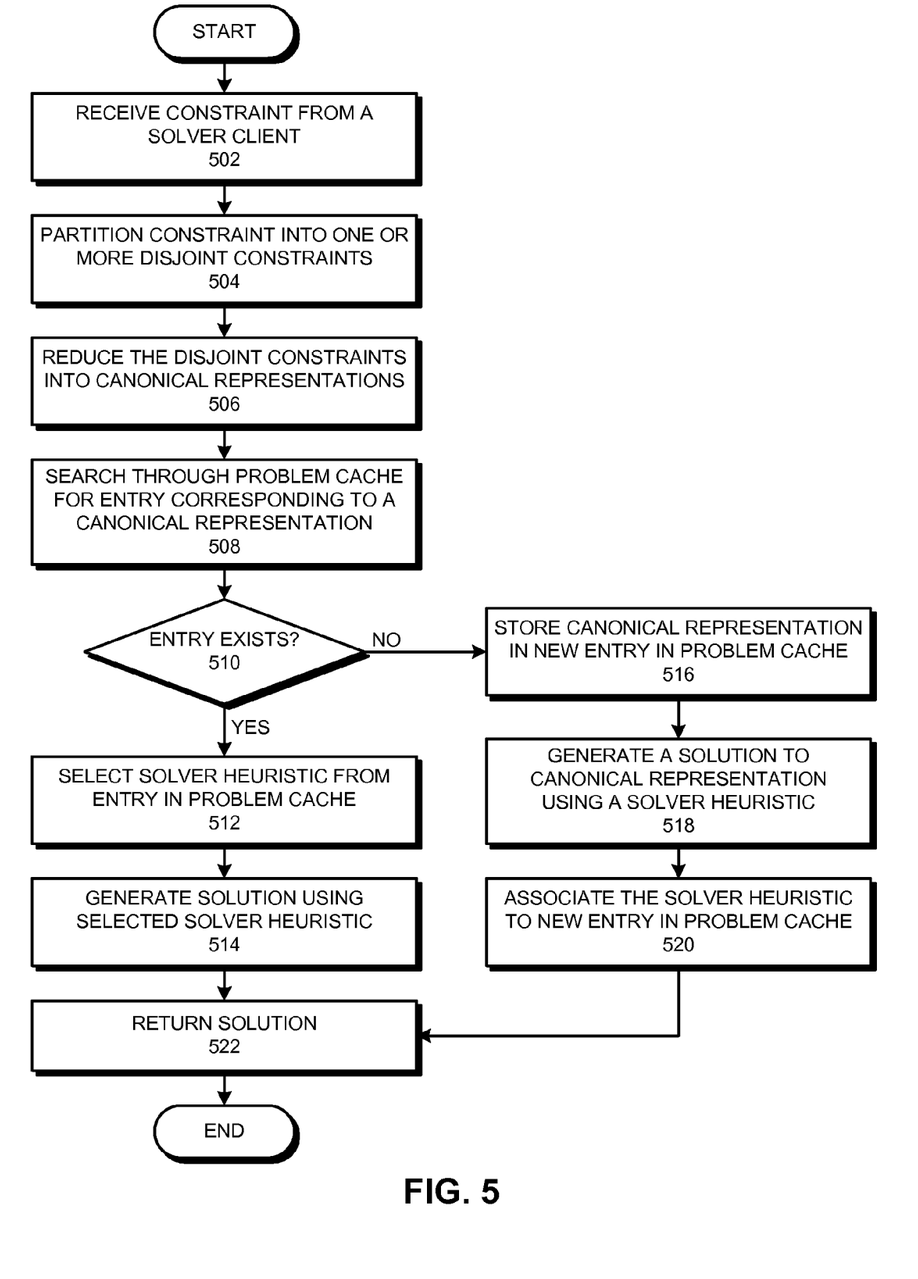
FIG. 5 presents a flowchart illustrating a process for reusing information associated with a constraint solving operation in accordance with an embodiment of the present invention.

FIG. 5 presents a flowchart illustrating a process for reusing information associated with a constraint solving operation in accordance with an embodiment of the present invention. The system begins by receiving a constraint from a solver client (operation 502). Next, the system partitions the constraint into one or more disjoint constraints (operation 504), and reduces the disjoint constraints into canonical representations (operation 506). In some embodiments of the present invention, the system only uses one resulting canonical representation to solve the constraint. In other embodiments of the present invention, the system solves multiple canonical representations and stores the metadata and/or their solutions in a problem cache for later use.

To solve a canonical representation, the system searches through a problem cache for an entry which corresponds to the canonical representation (operation 508), and determines if a corresponding entry exists (operation 510). If so, the system selects the solver heuristic from the corresponding entry in the problem cache (operation 512). Then, the system generates a solution to the canonical representation by using the selected solver heuristic (operation 514), and returns the solution to the solver client (operation 522).

If a corresponding entry does not exist in the problem cache, the system stores the canonical representation within a new entry in the problem cache (operation 516). Then, the system generates a solution to the canonical representation by using a solver heuristic (operation 518), and associates the solver heuristic to the new entry in the problem cache (operation 520). Finally, the system returns the solution to the solver client (operation 522).

Figure 6:
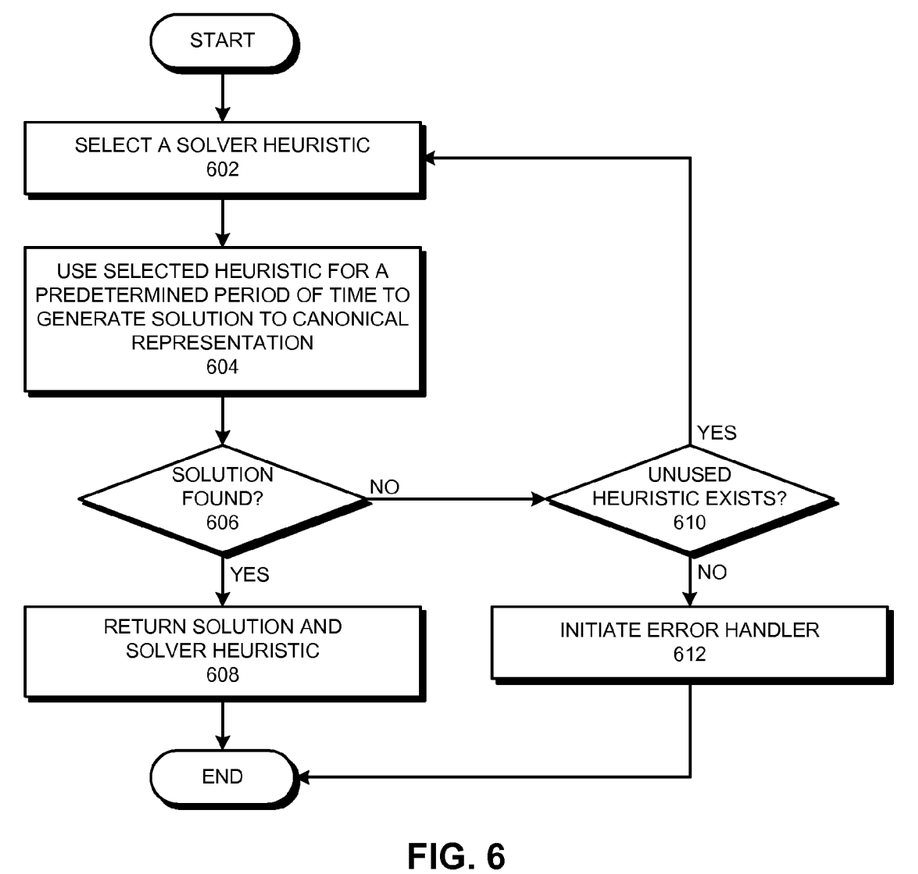
FIG. 6 presents a flowchart illustrating a process for generating a solution to a canonical constraint representation in accordance with an embodiment of the present invention.

FIG. 6 presents a flowchart illustrating a process for generating a solution to a canonical constraint representation, which expands upon operation 518 of FIG. 5, in accordance with an embodiment of the present invention. The system begins by selecting a solver heuristic from a collection of available solver heuristics (operation 602). Then, the system uses the selected solver heuristic for a predetermined period of time to generate a solution to a given canonical representation (operation 604). Next, the system determines if a solution was found (operation 606). If so, the system returns the solution and the solver heuristic that was used to generate the solution (operation 608).

If a solution was not found, the system determines if any unused solver heuristics exist (operation 610). If so, the system returns to operation 602 to select another solver heuristic. If no unused solver heuristics exist, the system initiates an error handler (operation 612). In one variation of this embodiment, the error handler reports an error. In another variation, the error handler flags the canonical representation as unsolveable so that later attempts to solve a similar constraint problem can be disregarded.

Figure 7:
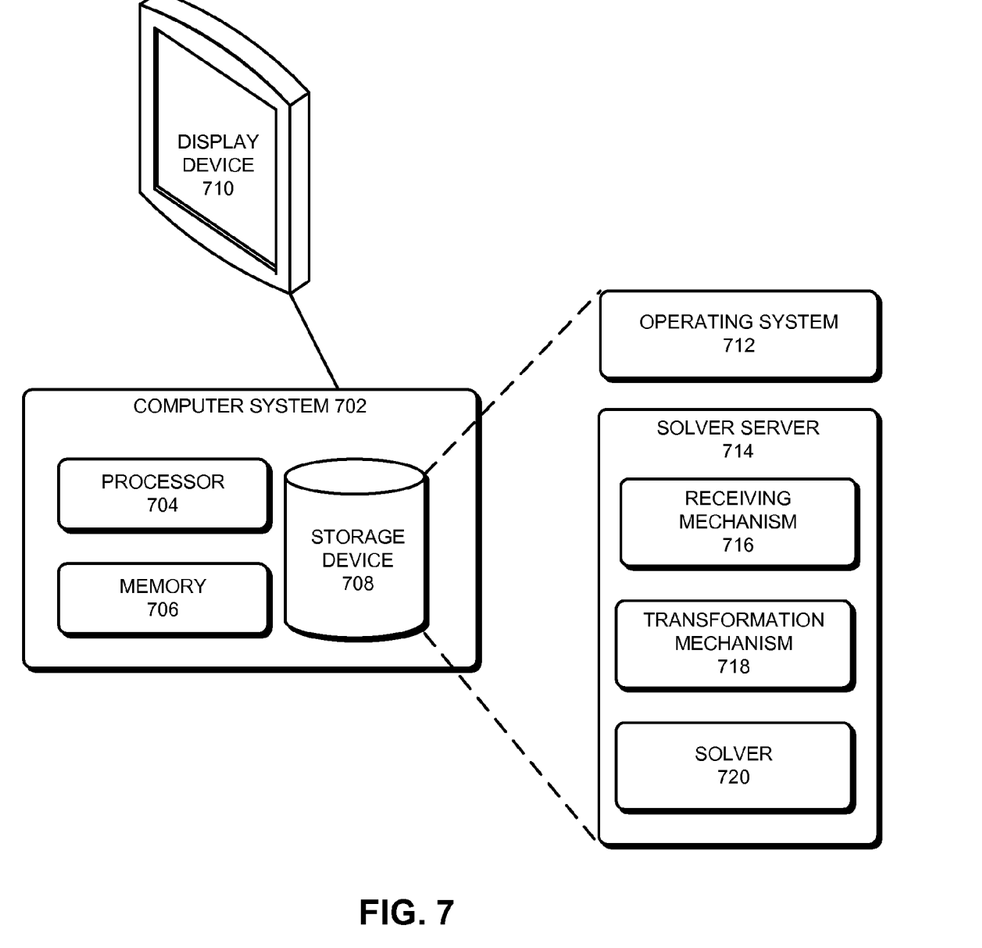
FIG. 7 illustrates a computer system that implements a solver server in accordance with an embodiment of the present invention.

FIG. 7 illustrates a computer system that implements a solver server in accordance with an embodiment of the present invention. A computer system 702 includes a processor 704, a memory 706, and a storage device 708. Computer system 702 is also coupled to a display device 710. Storage device 708 stores an operating system 712, and a solver server 714. Solver server 714 comprises a receiving mechanism 716, a transformation mechanism 718, and a solver 720. During operation, solver server 714 is loaded from storage device 708 into memory 706 and executed by processor 704.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reusing information associated with a constraint solving operation for a problem domain, the method comprising:
receiving a canonical representation for a constraint problem from the problem domain;
searching through a problem cache for an entry which corresponds to the canonical representation, wherein the problem cache stores a set of entries, and wherein each entry includes a previously stored canonical representation and a corresponding solver heuristic for the previously stored canonical representation; and
if a corresponding entry does not exist in the problem cache, producing an entry in the problem cache for the canonical representation;
otherwise, if a corresponding entry exists in the problem cache, generating a solution to the canonical representation by reusing a solver heuristic associated with the corresponding entry in the problem cache, which involves retrieving the solver heuristic from the corresponding entry.

2. The method of claim 1, wherein producing an entry in the problem cache for the canonical representation comprises:
storing the canonical representation of the constraint problem in the problem cache;
selecting a solver heuristic from a number of available heuristics;
generating a solution to the canonical representation by using the selected solver heuristic, wherein whenever the selected heuristic fails to generate a solution within a predetermined period of time, the system selects a new solver heuristic and uses the new heuristic to generate a solution to the canonical representation; and
associating the selected solver heuristic with the canonical representation entry in the problem cache.

3. The method of claim 1, wherein the method further comprises monitoring a computation time when generating a solution to a canonical representation, and storing the computation time in the corresponding canonical representation entry in the problem cache.

4. The method of claim 3, wherein the method further comprises refining the selection of solver heuristics using a background process.

5. The method of claim 1, wherein a solver server which performs the method is capable of executing a number of simultaneous threads, where a respective thread is associated with an independent constraint problem.

6. The method of claim 1, wherein the method further comprises converting a constraint problem into a canonical representation.

7. The method of claim 1, wherein the method further comprises providing a persistent solution for a specified canonical representation by recording and preserving in the problem cache the solver heuristic used to first solve the canonical representation, thereby allowing the same heuristic to be used when solving the specified canonical representation at a later time.

8. The method of claim 7, wherein the method further comprises providing random stability for a specified canonical representation by recording and preserving in the problem cache the random seed used to first solve the canonical representation, thereby allowing the system to produce a constant solution that is independent of the order in which the individual canonical representations are solved.

9. The method of claim 1, wherein the method further comprises recording a sequence of constraint problem solutions for a problem domain, and replaying the solution sequence for a subsequent problem domain.

10. The method of claim 1, wherein the method further comprises reusing the problem cache information across a plurality of independent problem domains associated with one or more applications.

11. A non-transitory computer-readable storage medium storing instructions that when executed by a computer cause the computer to perform a method for reusing information associated with a constraint solving operation for a problem domain, the method comprising:
receiving a canonical representation for a constraint problem from the problem domain;
searching through a problem cache for an entry which corresponds to the canonical representation, wherein the problem cache stores a set of entries, and wherein each entry includes a previously stored canonical representation and a corresponding solver heuristic for the previously stored canonical representation; and
if a corresponding entry does not exist in the problem cache, producing an entry in the problem cache for the canonical representation;
otherwise, if a corresponding entry exists in the problem cache, generating a solution to the canonical representation by reusing the solver heuristic associated with the corresponding entry in the problem cache, which involves retrieving the solver heuristic from the corresponding entry.

12. The non-transitory computer-readable storage medium of claim 11, wherein producing an entry in the problem cache for the canonical representation comprises:
storing the canonical representation of the constraint problem in the problem cache;
selecting a solver heuristic from a number of available heuristics;

generating a solution to the canonical representation by using the selected solver heuristic, wherein whenever the selected heuristic fails to generate a solution within a predetermined period of time, the system selects a new solver heuristic and uses the new heuristic to generate a solution to the canonical representation; and associating the selected solver heuristic with the canonical representation entry in the problem cache.

13. The non-transitory computer-readable storage medium of claim 11, wherein the method further comprises refining the selection of solver heuristics using a background process.

14. The non-transitory computer-readable storage medium of claim 11, wherein a solver server which performs the method is capable of executing a number of simultaneous threads, where a respective thread is associated with an independent constraint problem.

15. The non-transitory computer-readable storage medium of claim 11, wherein the method further comprises converting a constraint problem into a canonical representation.

16. The non-transitory computer-readable storage medium of claim 11, wherein the method further comprises providing a persistent solution for a specified canonical representation by recording and preserving in the problem cache the solver heuristic used to first solve the canonical representation, thereby allowing the same heuristic to be used when solving the specified canonical representation at a later time.

17. The non-transitory computer-readable storage medium of claim 16, wherein the method further comprises providing random stability for a specified canonical representation by recording and preserving in the problem cache the random seed used to first solve the canonical representation, thereby allowing the system to produce a constant solution that is independent of the order in which the individual canonical representations are solved.

18. The non-transitory computer-readable storage medium of claim 11, wherein the method further comprises recording a sequence of constraint problem solutions for a problem domain, and replaying the solution sequence for a subsequent problem domain.

19. The non-transitory computer-readable storage medium of claim 11, wherein the method further comprises reusing the problem cache information across a plurality of independent problem domains associated with one or more applications.

20. A constraint solver server for reusing information associated with a constraint solving operation for a problem domain, comprising:
   a receiving mechanism configured to receive a canonical representation for a constraint problem from the problem domain;
   a problem cache configured to store a set of entries, and wherein each entry includes a previously stored canonical representation and a corresponding solver heuristic for the previously stored canonical representation;
   a lookup mechanism configured to search through the problem cache for an entry which includes the canonical representation, and to retrieve the entry and the corresponding solver heuristic; and
   a solver mechanism configured to generate a solution to the canonical representation by using a selected solver heuristic;
   wherein if the problem cache does not contain an entry which corresponds to the canonical representation, the constraint solver server produces an entry in the problem cache for the canonical representation;
   otherwise if the problem cache does contain an entry which corresponds to the canonical representation, the solver mechanism generates a solution to the canonical representation by reusing the solver heuristic associated with the corresponding entry in the problem cache.

21. The constraint solver server of claim 20, wherein producing an entry in the problem cache for the canonical representation comprises:
   storing the canonical representation of the constraint problem in the problem cache;
   selecting a solver heuristic from a number of available heuristics;
   generating a solution to the canonical representation by using the selected solver heuristic, wherein whenever the selected heuristic fails to generate a solution within a predetermined period of time, the system selects a new solver heuristic and uses the new heuristic to generate a solution to the canonical representation; and
   associating the selected solver heuristic with the canonical representation entry in the problem cache.

22. The constraint solver server of claim 20, wherein the constraint solver server is capable of refining the selection of solver heuristics using a background process.

23. The constraint solver server of claim 20, wherein the constraint solver server is capable of executing a number of simultaneous threads, where a respective thread is associated with an independent constraint problem.

24. The constraint solver server of claim 20, further comprising a transformation mechanism configured to convert a constraint problem into a canonical representation.

25. The constraint solver server of claim 20, wherein the constraint solver server is capable of providing a persistent solution for a specified canonical representation by recording and preserving in the problem cache the solver heuristic used to first solve the canonical representation, thereby allowing the same heuristic to be used when solving the specified canonical representation at a later time.

26. The constraint solver server of claim 25, wherein the constraint solver server is capable of providing random stability for a specified canonical representation by recording and preserving in the problem cache the random seed used to first solve the canonical representation, thereby allowing the constraint solver server to produce a constant solution that is independent of the order in which the individual canonical representations are solved.

27. The constraint solver server of claim 20, wherein the constraint solver server is capable of recording, in the problem cache, a sequence of constraint problem solutions for a problem domain, and replaying the solution sequence for a subsequent problem domain.

28. The constraint solver server of claim 20, wherein the constraint solver server is capable of reusing the problem cache information across a plurality of independent problem domains associated with one or more applications.

* * * * *